Aug. 20, 1929.  W. C. KEYS  1,725,523
YIELDING CONNECTION
Filed April 18, 1928
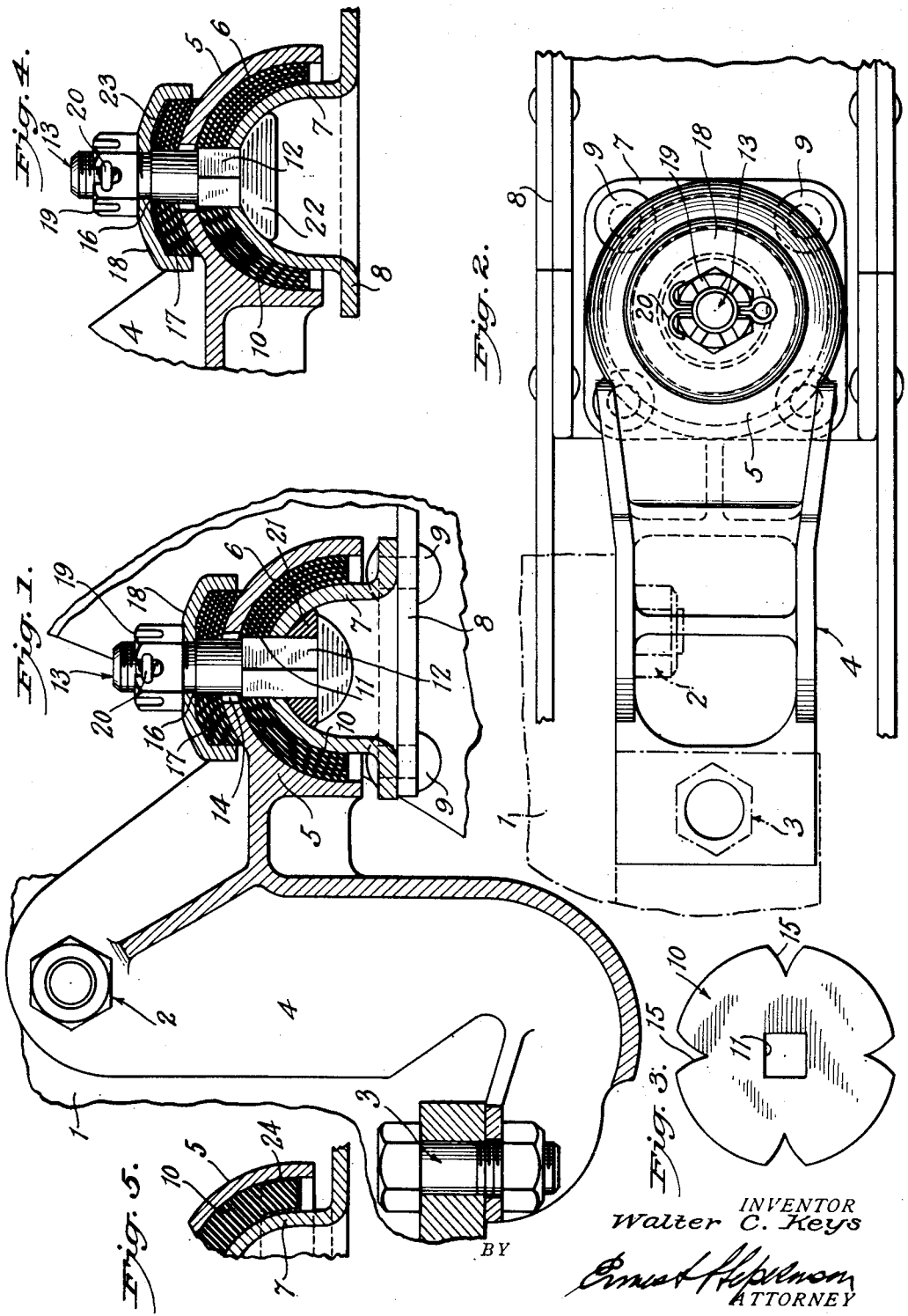
INVENTOR
Walter C. Keys
BY
Ernest Stephenson
ATTORNEY Patented Aug. 20, 1929.

1,725,523

UNITED STATES PATENT OFFICE.

WALTER C. KEYS, OF DETROIT, MICHIGAN, ASSIGNOR TO THE MECHANICAL RUBBER COMPANY, OF CLEVELAND, OHIO, A CORPORATION OF NEW JERSEY.

YIELDING CONNECTION.

Application filed April 18, 1928. Serial No. 270,997.

This invention relates in general to non-metallic connections, more particularly to cushion connections for mounting automobile engines.

In practically all automobiles, the gear shift lever and the pedals are respectively mounted directly on the transmission case and the fly wheel housing which are both secured solidly to the engine. Heretofore, when cushioning material has been incorporated in an engine mounting, there has been such freedom of motion between the engine and its supporting frame, that the gear shift lever and the pedals vibrated or shifted objectionably, particularly on rough roads.

One object of this invention is to provide a cushioning connection for substantially eliminating transmission of high frequency vibrations between the engine and its supporting frame, while at the same time maintaining the engine sufficiently rigid with respect to the frame for satisfactory operation. In carrying out this object, the engine is provided with a female member having a preferably hemispherical cavity, in which there is disposed a male member in the form of a hemispherical projection of smaller radius and carried by the engine supporting frame. Cushioning means, such as rubber composition, either plain or alternated with sheets of non-yielding material, such as, sheet metal, is interposed between the two members, and a bolt is arranged to hold all of the mounting parts together. The two members and the rubber composition cooperate in a manner to substantially eliminate the transmission of vibrations arising in either the engine or the frame and at the same time provide for proper stability of the engine with respect to the frame.

Another object is to provide means for adjusting the connection to alter the stabilizing characteristics thereof. A further object is to provide a connection which is simple in construction, easy to attach and inexpensive to manufacture.

Other features and advantages will appear as the description proceeds.

In the accompanying drawing, illustrating one embodiment of the invention,

Fig. 1 is a vertical section of the cushioning connection installed;

Fig. 2 is a plan view thereof;

Fig. 3 represents a cushioning element;

Fig. 4 is a fragmental vertical section of a modification; and

Fig. 5 is a fragmental detail.

Referring to the drawing which is merely illustrative of a single embodiment of the invention, 1 represents an automobile engine to which there may be bolted, as indicated at 2 and 3, at three or more points, as well understood in the art, a bracket or other attaching member 4 provided with a lateral extension 5 having a female portion, in this instance, a hemispherical cavity 6 adapted to be disposed downward over a male member in the form of a hemispherical projection 7 of smaller radius than the cavity 6 and secured to the engine supporting frame 8, as by rivets 9 or otherwise. In some cases it may be found preferable to form the projection 7 as an integral part of the frame 8, such as by pressing. This type is illustrated in Fig. 4. It is also obvious that the member 4 may form an integral part of the engine. For cushioning the engine 1 with respect to the frame 8, there is provided between the surfaces of the hemispherical cavity 6 and the hemispherical projection 7, a cushioning element 10 preferably of rubber composition which may consist of solid rubber, or rubber layers alternated with fabric or other suitable material. The cushioning element 10 may have a square perforation 11 which tightly embraces the square shank 12 of a bolt 13 projecting upwardly through the center of the projection 7. A perforation 14 is provided in the top of the extension 5 at the center of the cavity 6, and during assembly, the tight fitting cushioning element 10 prevents the bolt 13 from dropping while the member 4 is positioned to bring the perforation 14 over the bolt 13. The perforation 14 is preferably of a size to provide clearance around the bolt 13 so as to allow for play and prevent metal to metal contact.

According to the preferred practice, as many attaching members 4 as are necessary to comprise an installation, are bolted to the engine in the manner described and then the whole assembly is brought to position over the frame 8 with the perforations 14 centered over the bolts 13. The assembly is then lowered to project the bolts 13 through the perforations 14 and to cause all of the cushioning elements 10 to be formed into hemispherical shape between the cavities 6 and the projections 7. In order to facilitate formation of the cushioning elements 10 into hemispherical form without crinkling at the edges, they are preferably provided with peripheral notches 15. While this is the preferred method of forming the cushioning members 10 into shape, because of its simplicity and time saving advantages, this shaping may be obtained in any other manner, as by previous vulcanization.

That portion of the bolt 13 extending through the perforation 14 is preferably reduced at 16 to provide a shoulder and is threaded thereabove. A rubber washer 17 which may be of the same materials as the cushioning element 10 is received over the threaded end of each bolt 13 and a metallic retaining cap 18 on the bolt 13 is adapted to be drawn down by a nut 19 to position against the shoulder 16 whereby to tighten the rubber washer 17 between the retaining cap 18 and the top of the extension 5, opposite to the cavity 6, and thereby hold the cushioning element 10 tightly between the walls of the cavity 6 and the projection 7, while at the same time securing the retaining cap 18 solidly to the bolt 13. Any form of nut locking means may be used such as a cotter pin 20.

A hard non-metallic insulator 21 may be provided between the head of the bolt 13 and the projection 7 if found advisable to prevent metallic contact of these parts. In some cases, the bolt 13 may be formed with a rounded head 22 which fits snugly against the rounded inside wall of the projection 7, as illustrated in Fig. 4.

Where it is found desirable to alter the adjustment of the rubber cushioning element 10, thin shims 23 may be added or removed from between the retaining cap 18 and the rubber washer 17. This applies to either of the examples illustrated in Figs. 1 and 4. It will be noted that even though shims are used for adjustment purposes, the retaining cap 18 is always held solidly against the shoulder 16 by the nut 19, thus eliminating any possibility of noise or movement developing at this point.

In the Fig. 1 embodiment the center of radius of the projection 7 preferably coincides with that of the cavity 6, and the rubber cushioning element 10 is uniform in thickness. It will be seen that the cavity 6 cooperates with the cushioning element 10 and the projection 7 to prevent lateral shifting of the engine with respect to the frame while affording cushioning in all directions. Where it is necessary to obtain greater lateral stability, the projection 7 may be of slightly larger radius such as that shown in Fig. 4 and positioned eccentrically to the center of radius of the cavity 6, whereby the clearance space is decreased adjacent the base of the projection 7, and the peripheral portion of the cushioning element 10 is consequently under greater compression all the way around the projection 7 at this point, while the vertical cushioning effect remains substantially the same as in Fig. 1. In Fig. 5, the numeral 24 indicates a fabric ring, U-shaped in cross section, which may be provided at the lower edge of the cushioning element 10 to confine the rubber.

While the cooperating faces of the cavity 6 and the projection 7 are preferably hemispherical in form, the invention is not limited to this precise shape but comprehends any cavity formation which, while permitting the interposed cushioning element 10 to yield and thus eliminate the transmission of vibration, prevents excessive shifting in a plane substantially at right angles to the vertical direction of cushioning. The hemispherical shape illustrated in the drawings is preferred because it is satisfactory and simple but any cavity or socket construction would possess some of the advantages of the invention. The cooperating members 5 and 7 obviously may be made integral with one or both of the parts to be connected, if desired, or either or both may be made detachable. In some cases the top of the extension 5 may be flat instead of rounding and it is therefore obvious that the washer 17 and the retaining cap 18 would be of a flat variety so as to properly cooperate with the flat surface of the extension. It is also clear that the nut 19 may be retained in adjusted position on the bolt 13 by a lock-nut and that the head of the bolt may extend downward to anchorage in the frame 8, in which case the male member 7 may be solid in form except for the necessary perforation to allow passage of the bolt shank.

From the foregoing description, the invention will be understood to contemplate a cushioning connection by means of which an engine of an automobile, for instance, may be yieldingly connected to the frame so as to eliminate the transmission of high frequency vibrations of small amplitude, but which prevents any objectionable shifting of the engine relative to the frame of the car. The invention is obviously applicable as a cushioning connection between any two parts of a device, one of which is liable to vibrate and set up vibrations in the other part, and it is therefore not intended to confine the invention to the illustrated embodiment.

Having thus described my invention what I claim and desire to protect by Letters Patent is:

1. A cushioning connection comprising a metallic member having a cavity, a metallic member extending into the cavity and constituting therewith opposed walls within the confines of the cavity, cushioning material interposed between said walls, and means for holding said walls and the cushioning material in cooperative relation, the said walls being arranged to resist relative motion of the two metallic members vertically and laterally.

2. A cushioning connection comprising two metallic members, one of which has a cavity and the other member including a projection disposed within the confines of the cavity and constituting therewith opposed walls, cushioning material disposed between said opposed walls, and adjustable yieldable means for holding said walls and the cushioning material in cooperative working relation, the said walls being shaped to resist relative motion of the two members vertically and laterally.

3. A cushioning connection comprising a member having a hemispherical cavity, a member having a hemispherical projection disposed in said cavity, rubber composition interposed between the walls of said cavity and said hemispherical projection, and yielding means for holding the members and said rubber composition together.

4. A cushioning connection comprising a member having a hemispherical cavity, a member having a hemispherical projection disposed in said cavity, rubber composition interposed between the walls of said cavity and said hemispherical projection, a bolt, a nut therefor, and yielding means coacting with said bolt and nut to hold said rubber composition and said members in cooperative relation.

5. A cushioning connection comprising a member having a hemispherical cavity, a member having a hemispherical projection disposed in said cavity, rubber composition interposed between the walls of said cavity and said hemispherical projection, a bolt extending through said members and said rubber composition in a manner to obviate transmission of vibrations from one member to the other, a nut for the bolt, yielding means comprising a rubber washer coacting with said bolt and nut to hold said members in cooperative relation, and a retainer cap having flanges adapted to confine said rubber washer.

6. A cushioning connection including a member having a cavity, a second member having a projection of similar contour but smaller dimensions than said cavity and disposed therein, rubber composition interposed between the walls of said cavity and said projection, a bolt adapted to pass through said members and said composition, a nut for the bolt, and a rubber washer cooperating with said bolt and nut to hold said rubber composition and said members together, said cavity and said projection being shaped to resist relative motion of the two members vertically and laterally.

7. A cushioning connection including a member having a rounded cavity, a second member having a rounded projection disposed in said cavity, rubber composition interposed between the walls of said cavity and said rounded projection, a headed bolt arranged to pass through said members and said composition, said bolt being clear of contact with one of said members, a nut for the bolt, a rubber washer between said nut and the adjacent member, and non-metallic insulation between the head of said bolt and the other member, said cavity and said projection being shaped to resist relative motion of the two members vertically and laterally.

8. A cushioning connection including a member having a rounded cavity, a second member having a rounded projection disposed in said cavity, rubber composition interposed between the walls of said cavity and said rounded projection, a bolt arranged to pass through the members and said rubber composition, a nut for the bolt, a rubber washer under the nut, and a retaining cap between the washer and the nut, said bolt having a shoulder against which the nut holds said retaining cap with said washer and the rubber composition under compression, one of said members having a clearance space around said bolt, and the other member being adapted to hold said bolt against turning.

9. A cushioning connection including a member having a rounded cavity, a second member having a rounded projection disposed in said cavity, rubber composition interposed between the walls of said cavity and said rounded projection, a bolt arranged to pass through the members and said rubber composition, a nut for the bolt, a rubber washer under the nut, a retaining cap between the washer and the nut, said bolt having a shoulder against which the nut holds said retaining cap with said washer and the rubber composition under compression, and means for varying the compression, comprising shims between said retaining cap and the washer, the shims being free of said shoulder.

Signed at Detroit, county of Wayne, State of Michigan, this 31st day of March, 1928.

WALTER C. KEYS.